(12) United States Patent
Alldredge et al.

(10) Patent No.: US 11,183,867 B2
(45) Date of Patent: Nov. 23, 2021

(54) CHARGING SYSTEM FOR A BARCODE READER THAT USES DIFFERENT TYPES OF RECHARGEABLE POWER SOURCES

(71) Applicant: The Code Corporation, Murray, UT (US)

(72) Inventors: Eric Alldredge, Herriman, UT (US); Ryan Hoobler, Salt Lake City, UT (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 17/027,497

(22) Filed: Sep. 21, 2020

(65) Prior Publication Data

US 2021/0006090 A1   Jan. 7, 2021

Related U.S. Application Data

(63) Continuation of application No. 16/141,273, filed on Sep. 25, 2018, now Pat. No. 10,784,709.

(60) Provisional application No. 62/562,913, filed on Sep. 25, 2017.

(51) Int. Cl.
*H02J 7/34* (2006.01)
*H02J 7/00* (2006.01)
*G06K 7/10* (2006.01)
*G06F 1/26* (2006.01)
*H01M 50/20* (2021.01)

(52) U.S. Cl.
CPC .............. *H02J 7/345* (2013.01); *G06F 1/263* (2013.01); *G06K 7/10881* (2013.01); *H02J 7/007* (2013.01); *H02J 7/00043* (2020.01); *H02J 7/0045* (2013.01); *H01M 50/20* (2021.01); *H01M 2220/30* (2013.01)

(58) Field of Classification Search
CPC ...... H02J 7/345; H02J 7/00043; H02J 7/0045; H02J 7/007; H02J 7/34; H02J 7/00; G06F 1/263; G06F 1/26; G06K 7/10881; G06K 7/10; H01M 50/20; H01M 2220/30
See application file for complete search history.

*Primary Examiner* — Robert L Deberadinis
(74) *Attorney, Agent, or Firm* — Timothy P. O'Hagan; Ray Quinney & Nebeker

(57) ABSTRACT

A system includes a barcode reader that is configured to use different types of rechargeable power sources and charging circuitry that is configured to provide a charging current and a charging voltage for a rechargeable power source that is being used by the barcode reader. The charging circuitry is configured to adjust the charging current and the charging voltage for the different types of rechargeable power sources that are used by the barcode reader.

20 Claims, 8 Drawing Sheets

CHARGING SYSTEM FOR A BARCODE READER THAT USES DIFFERENT TYPES OF RECHARGEABLE POWER SOURCES

CLAIM OF PRIORITY

The present application is a continuation of U.S. patent application Ser. No. 16/141,273 (the '273 Application), filed Sep. 25, 2018. The '273 Application claims the benefit of U.S. Provisional Patent Application No. 62/562,913, filed Sep. 25, 2017. Each of the aforementioned is incorporated herein by reference in its entirety.

BACKGROUND

A barcode is an optical machine-readable representation of information. Devices for identifying or extracting information from barcodes are generally referred to as barcode readers (or barcode scanners). Barcodes and barcode readers have become widely used in many different types of environments, such as hospitals, point-of-sale stations in retail stores and supermarkets, inventory and document tracking, and the like.

Barcode readers may be powered by a rechargeable power source, such as a rechargeable battery. A rechargeable battery is a type of electrical battery that can be charged, discharged, and recharged multiple times. Like non-rechargeable batteries, rechargeable batteries produce electrical current through an electrochemical reaction involving electrodes and an electrolyte. In a rechargeable battery, however, the electrochemical reaction is reversible. Several different combinations of electrode materials and electrolytes may be used. Some examples of rechargeable batteries on the market today include lithium ion, lithium ion polymer, nickel cadmium, nickel metal hydride, and lead acid.

The manufacturer of a barcode reader typically provides a holder for the reader, which may be referred to as a "cradle." In addition to providing a convenient place to store the reader, the cradle may also be used to charge the reader's rechargeable battery. When the cradle is connected to an external power source (e.g., a wall outlet, a desktop personal computer (PC)) and the barcode reader is placed within the cradle, the barcode reader draws electrical current from the cradle and thereby charges the reader's rechargeable battery.

SUMMARY

In accordance with one aspect of the present disclosure, a system includes a barcode reader that is configured to use different types of rechargeable power sources and charging circuitry that is configured to provide a charging current and a charging voltage for a rechargeable power source that is being used by the barcode reader. The charging circuitry is configured to adjust the charging current and the charging voltage for the different types of rechargeable power sources that are used by the barcode reader.

The charging circuitry may be configured to provide a first charging current and a first charging voltage if the rechargeable power source comprises a first type of rechargeable power source. The charging circuitry may be configured to provide a second charging current and a second charging voltage if the rechargeable power source comprises a second type of rechargeable power source. The first type of rechargeable power source may comprise a rechargeable battery, and the second type of rechargeable power source may comprise a supercapacitor.

The charging circuitry may be configured to detect a type of rechargeable power source that is being used by the barcode reader, and provide the charging current and the charging voltage that are appropriate for that type of rechargeable power source.

The charging circuitry may be configured to receive notification from the rechargeable power source about the charging current and the charging voltage that are appropriate for the rechargeable power source.

The barcode reader may additionally a first set of reader charging contacts corresponding to a first type of rechargeable power source and a second set of reader charging contacts corresponding to a second type of rechargeable power source. The first type of rechargeable power source may be positionable within the barcode reader such that first charging contacts on the first type of rechargeable power source are in physical contact with the first set of reader charging contacts. The second type of rechargeable power source may be positionable within the barcode reader such that second charging contacts on the second type of rechargeable power source are in physical contact with the second set of reader charging contacts.

The charging circuitry may additionally be configured to provide a first charging current and a first charging voltage to the first set of reader charging contacts, and to provide a second charging current and a second charging voltage to the second set of reader charging contacts.

The system may further comprise a charging cradle for the barcode reader. The charging cradle may comprise a first set of cradle charging contacts corresponding to the first type of rechargeable power source and a second set of cradle charging contacts corresponding to the second type of rechargeable power source. The first set of reader charging contacts, the second set of reader charging contacts, the first set of cradle charging contacts, and the second set of cradle charging contacts may be positioned such that when the barcode reader is placed in the charging cradle, the first set of reader charging contacts are in physical contact with the first set of cradle charging contacts and the second set of reader charging contacts are in physical contact with the second set of cradle charging contacts.

The charging circuitry may additionally be configured to provide the first charging current and the first charging voltage to the first set of cradle charging contacts, and to provide the second charging current and the second charging voltage to the second set of cradle charging contacts.

The system may further comprise a charging cradle for the barcode reader. The charging circuitry may further comprise a cradle charging coil within the charging cradle and a reader charging coil within the barcode reader. The cradle charging coil may transfer energy to the reader charging coil via electromagnetic induction when the charging cradle is connected to an external power source and the barcode reader is placed in the charging cradle.

In accordance with another aspect of the present disclosure, a system includes a charging cradle that is configured to charge a rechargeable power source. Charging circuitry within the charging cradle may be configured to provide a first charging current and a first charging voltage if the rechargeable power source corresponds to a first type of rechargeable power source, and provide a second charging current and a second charging voltage if the rechargeable power source corresponds to a second type of rechargeable power source.

The first type of rechargeable power source may comprise a rechargeable battery. The second type of rechargeable power source may comprise a supercapacitor.

The charging circuitry may be configured to detect whether the rechargeable power source corresponds to the first type of rechargeable power source or the second type of rechargeable power source.

The charging circuitry may be configured to receive notification from the rechargeable power source about a charging current and a charging voltage that are appropriate for the rechargeable power source.

The charging cradle may comprise a first set of cradle charging contacts corresponding to the first type of rechargeable power source and a second set of cradle charging contacts corresponding to the second type of rechargeable power source. The first type of rechargeable power source may be positionable within the charging cradle such that first charging contacts on the first type of rechargeable power source are in physical contact with the first set of cradle charging contacts. The second type of rechargeable power source may be positionable within the charging cradle such that second charging contacts on the second type of rechargeable power source are in physical contact with the second set of cradle charging contacts. The charging circuitry may additionally be configured to provide the first charging current and the first charging voltage to the first set of cradle charging contacts, and provide the second charging current and the second charging voltage to the second set of cradle charging contacts.

In accordance with another aspect of the present disclosure, a system includes a barcode reader that is configured to use different types of rechargeable power sources. The system also includes charging circuitry that is configured to provide a first charging current and a first charging voltage if a rechargeable power source that is being used by the barcode reader corresponds to a first type of rechargeable power source, and provide a second charging current and a second charging voltage if the rechargeable power source that is being used by the barcode reader corresponds to a second type of rechargeable power source.

The charging circuitry may additionally be configured to detect whether the rechargeable power source that is being used by the barcode reader corresponds to the first type of rechargeable power source or the second type of rechargeable power source.

The charging circuitry may additionally be configured to receive notification from the rechargeable power source about a charging current and a charging voltage that are appropriate for the rechargeable power source that is being used by the barcode reader.

The barcode reader further comprises a first set of reader charging contacts corresponding to a first type of rechargeable power source and a second set of reader charging contacts corresponding to a second type of rechargeable power source. The first type of rechargeable power source may be positionable within the barcode reader such that first charging contacts on the first type of rechargeable power source are in physical contact with the first set of reader charging contacts. The second type of rechargeable power source may be positionable within the barcode reader such that second charging contacts on the second type of rechargeable power source are in physical contact with the second set of reader charging contacts.

DETAILED DESCRIPTION

The present disclosure is generally related to a barcode reader that is configured to use different types of rechargeable power sources. For example, in addition to being configured to use a rechargeable battery, a barcode reader may also be configured to use at least one other type of rechargeable power source, such as a supercapacitor. Charging circuitry provides an appropriate charging current and charging voltage for the type of rechargeable power source that is being used by the barcode reader. Because different types of rechargeable power sources may have different current and voltage requirements, the charging circuitry adjusts the charging current and the charging voltage for the different types of rechargeable power sources that are used by the barcode reader. For example, the charging circuitry may be configured to provide a first charging current and a first charging voltage if the rechargeable power source comprises a first type of rechargeable power source (e.g., a rechargeable battery), and a second charging current and a second charging voltage if the rechargeable power source comprises a second type of rechargeable power source (e.g., a supercapacitor).

Figure 1:
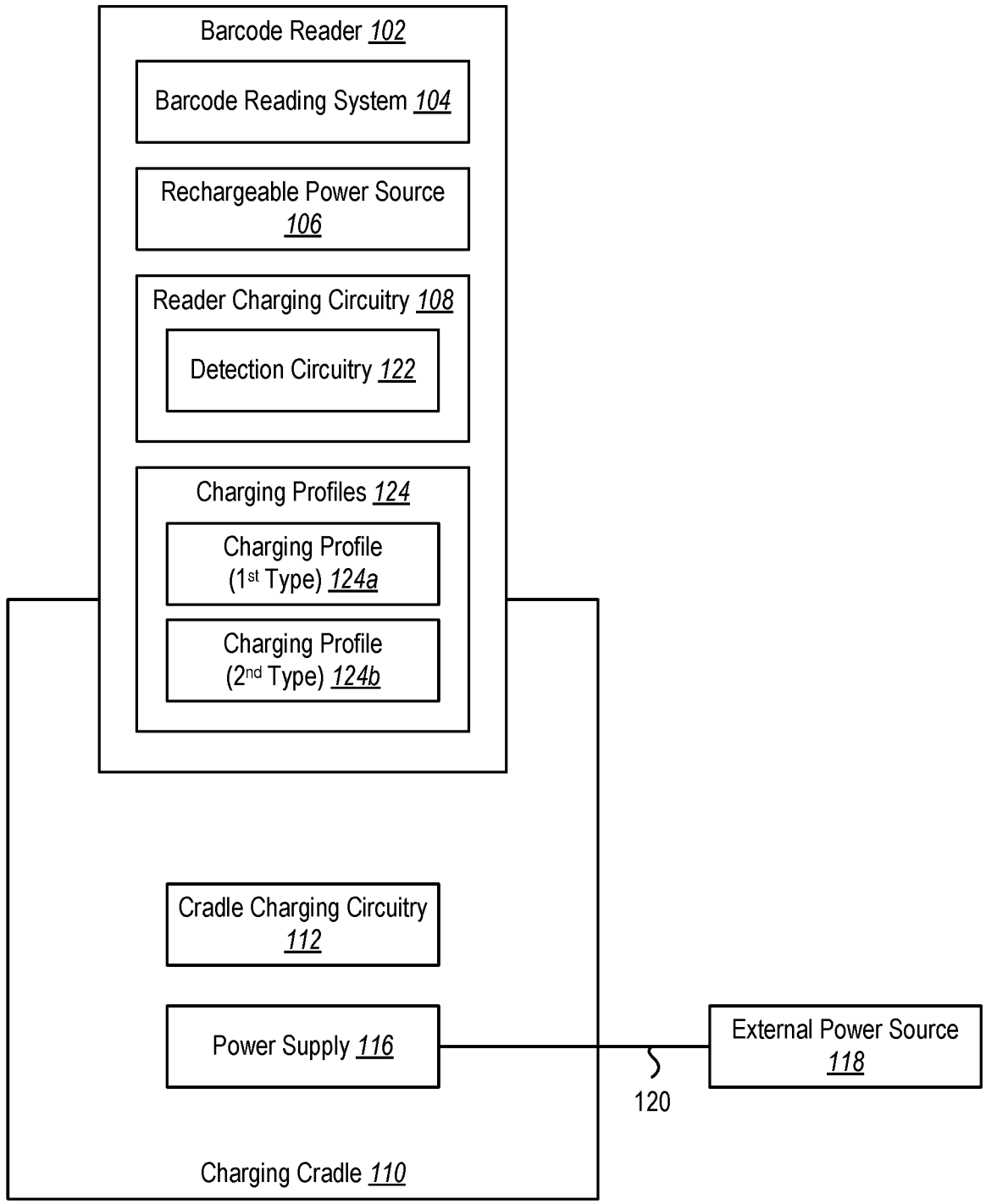
FIG. 1 illustrates an example of a charging system in accordance with the present disclosure, in which the charging circuitry detects the type of rechargeable power source that is being used by the barcode reader.

FIG. 1 illustrates an example of a charging system 100 for a barcode reader 102 in accordance with the present disclosure. The barcode reader 102 includes a barcode reading system 104, which includes one or more components that function together to read barcodes. For example, if the barcode reader 102 is a camera-based reader, then the barcode reading system 104 may include an illumination system, an image sensor, and a decoder. Alternatively, if the barcode reader 102 is another type of reader (e.g., a laser scanner), then the barcode reading system 104 may include other types of components (e.g., a laser and photodiode receive circuitry) that function together to read barcodes.

The barcode reader 102 also includes at least one rechargeable power source 106. The rechargeable power source 106 may deliver power to the barcode reader 102 during the operation of the barcode reader 102. The barcode reader 102 may be capable of using different types of rechargeable power sources 106. For example, the barcode reader 102 may be configured to use a rechargeable battery as a rechargeable power source 106. The barcode reader 102 may also be configured to use at least one other type of rechargeable power source 106, such as a supercapacitor.

The term "supercapacitor," as used herein, refers to a high-capacity electrochemical capacitor with capacitance values that are significantly higher than other types of capacitors. Supercapacitors typically store 10 to 100 times more energy per unit volume or mass than electrolytic capacitors. Supercapacitors do not use the conventional solid dielectric of ordinary capacitors. Instead, supercapacitors use electrostatic double-layer capacitance or electrochemical pseudocapacitance or a combination of both.

The charging system 100 includes circuitry that is configured to provide an appropriate charging current and charging voltage for the type of rechargeable power source 106 that is being used by the barcode reader 102. Some of this circuitry may be included in the barcode reader 102 itself, and may be referred to herein as reader charging circuitry 108. Some of this circuitry may be included in a charging cradle 110 with which the barcode reader 102 interfaces, and may be referred to herein as cradle charging circuitry 112. The term "charging circuitry," as used herein, may refer to reader charging circuitry 108, cradle charging circuitry 112, or both reader charging circuitry 108 and cradle charging circuitry 112.

The charging cradle 110 may include a power supply 116. The charging cradle 110 may be electrically coupled to an external power source 118 via an electrical cable 120. The external power source 118 may be, for example, a building's alternating current (AC) power supply (via a wall outlet), in which case the charging cradle 110 may include an AC power receptacle. Alternatively, the external power source 118 may be a computing device, in which case the charging cradle 110 may include a connector such as a Universal Serial Bus (USB) port.

The charging circuitry in the system 100 (i.e., the reader charging circuitry 108 and/or the cradle charging circuitry 112) may be configured to convert electricity that is available from the external power source 118 into current(s) and voltage(s) that are appropriate for the rechargeable power source 106. Because different types of rechargeable power sources 106 have different current and voltage requirements, the charging circuitry adjusts the charging current and the charging voltage for the different types of rechargeable power sources 106 that are used by the barcode reader 102.

In the depicted embodiment, the reader charging circuitry 108 includes circuitry that detects the type of rechargeable power source 106 that is being used by the barcode reader 102. This circuitry will be referred to herein as detection circuitry 122. Once the type of rechargeable power source 106 that is being used by the barcode reader 102 has been detected, the charging circuitry may then provide the charging current and the charging voltage that are appropriate for that type of rechargeable power source 106. For example, if the detection circuitry 122 detects that the rechargeable power source 106 is a first type of rechargeable power source 106 (e.g., a rechargeable battery), the charging circuitry may then provide the charging current and the charging voltage that are appropriate for the first type of rechargeable power source 106. Alternatively, if the detection circuitry 122 detects that the rechargeable power source 106 is a second type of rechargeable power source 106 (e.g., a supercapacitor), the charging circuitry may then provide the charging current and the charging voltage that are appropriate for the second type of rechargeable power source 106.

In some implementations, one or more charging profiles 124 may be defined for the various types of rechargeable power sources 106 that the barcode reader 102 is capable of using. For example, if the barcode reader 102 is capable of using a first type of rechargeable power source 106 (e.g., a rechargeable battery) and a second type of rechargeable power source 106 (e.g., a supercapacitor), then at least one charging profile 124a may be defined for the first type of rechargeable power source 106, and at least one charging profile 124b may be defined for the second type of rechargeable power source 106. The charging circuitry may be configured to provide charging current(s) and charging voltage(s) that follow the charging profile 124 that has been defined for the type of rechargeable power source 106 that is currently in use by the barcode reader 102. This may involve adjusting the impedance of one or more circuits within the charging circuitry.

Figure 2A:
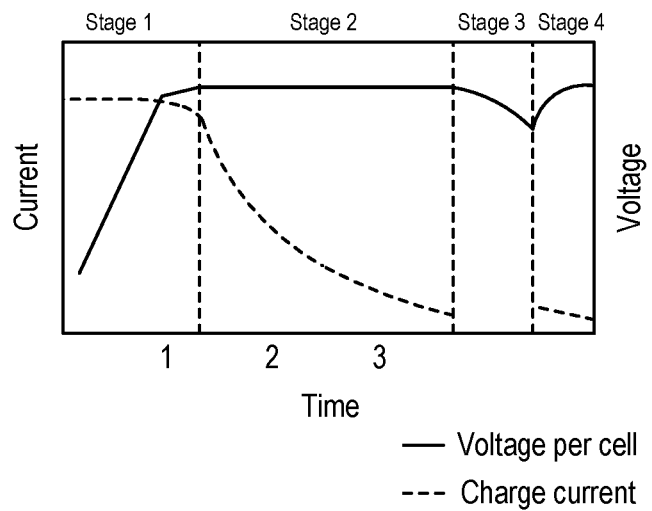
FIG. 2A illustrates an example of a charging profile for a rechargeable battery.

FIG. 2A illustrates an example of a charging profile 224a for a rechargeable battery (specifically, a lithium ion rechargeable battery). In this example, the charging profile 224a includes four stages. During stage one, the charging current is substantially constant, and the voltage of the rechargeable battery increases. During stage two, the charging current decreases, and the voltage of the rechargeable battery is substantially constant. During stage three, there is no charging current, and the voltage of the rechargeable battery decreases slightly. During stage four, there is a small amount of charging current, and the voltage of the rechargeable battery increases slightly.

To implement this charging profile 224a, the charging circuitry may set the impedance of one or more circuits to provide a substantially constant charging current during stage one. The charging circuitry may then substantially increase the impedance during stage two and stage three, in order to reduce the charging current. The charging circuitry may then slightly decrease the impedance during stage four, in order to provide a small amount of charging current.

Figure 2B:
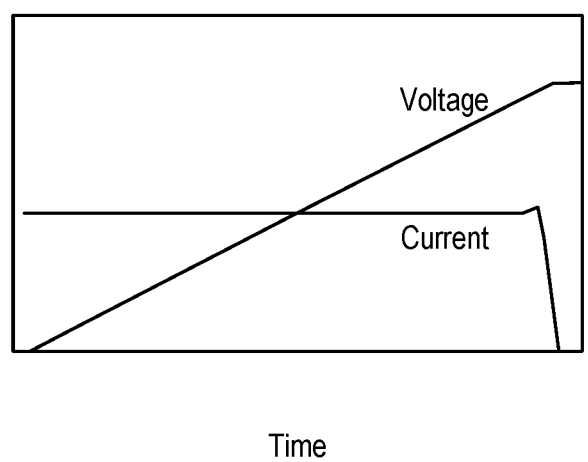
FIG. 2B illustrates an example of a charging profile for a supercapacitor.

FIG. 2B illustrates an example of a charging profile 224b for a supercapacitor. This charging profile includes two stages. During stage one, the charging current is substantially constant, and the voltage of the supercapacitor increases. During stage two, the charging current decreases, and the voltage of the rechargeable battery is substantially constant.

To implement this charging profile 224b, the charging circuitry may set the impedance of one or more circuits to provide a substantially constant charging current during stage one. The charging circuitry may then substantially increase the impedance during stage two, in order to reduce the charging current.

The charging profiles 224a-b shown in FIGS. 2A-B are provided as examples of the charging profiles 124a-b that were referred to previously in connection with the charging system 100 shown in FIG. 1, and they should not be interpreted as limiting the scope of the present disclosure. Other types of charging profiles may be defined and used in accordance with the present disclosure.

Figure 3:
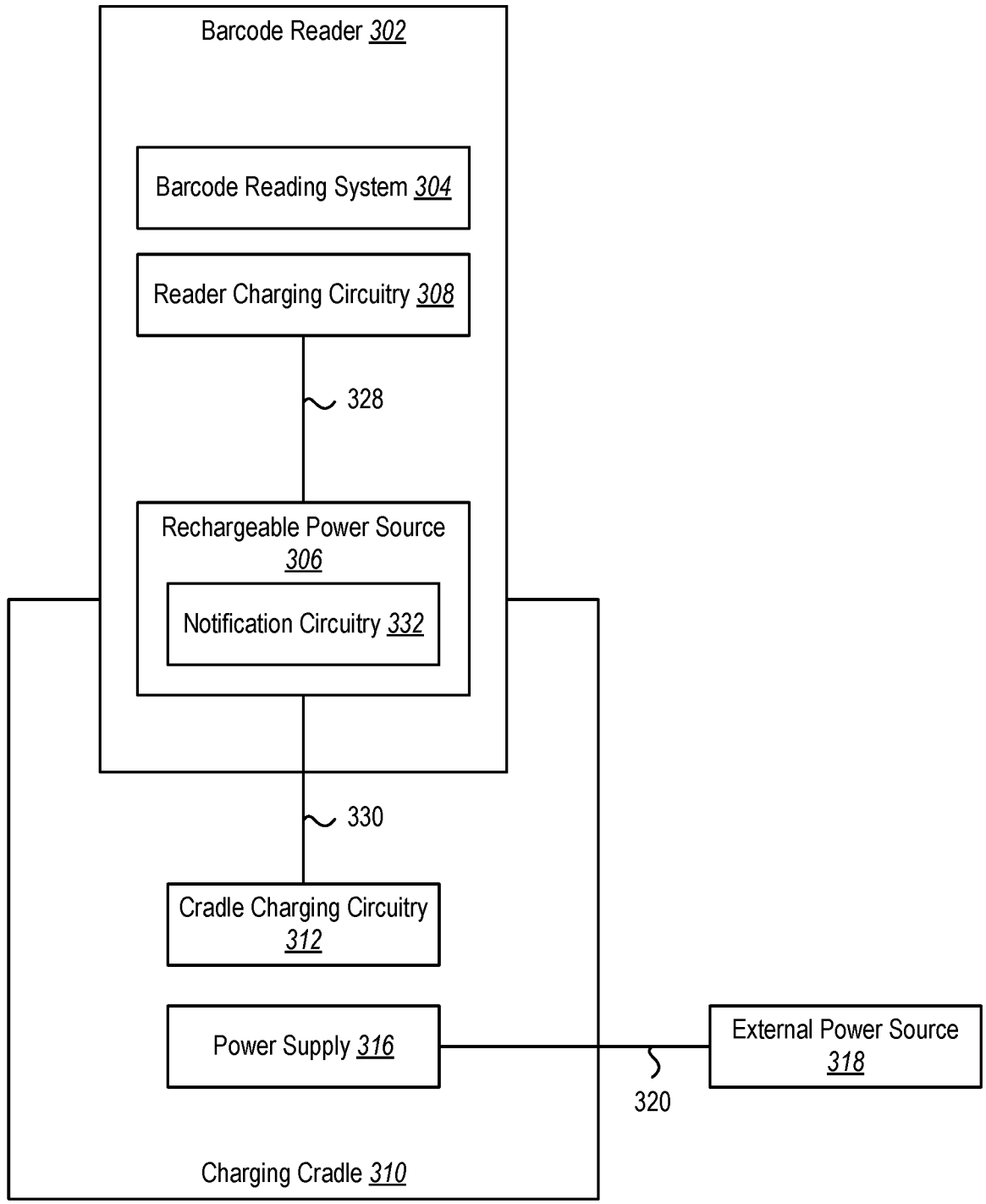
FIG. 3 illustrates another example of a charging system in accordance with the present disclosure, in which the charging circuitry receives notification from the rechargeable power source about the charging current and the charging voltage that are appropriate for the rechargeable power source.

FIG. 3 illustrates another example of a charging system 300 for a barcode reader 302 in accordance with the present disclosure. The charging system 300 is similar in some respects to the charging system 100 that was described above in connection with FIG. 1. For example, the charging system 300 includes a barcode reader 302 having a barcode reading system 304. The barcode reader 302 is configured to use different types of rechargeable power sources 306. The barcode reader 302 interfaces with a charging cradle 310. The charging cradle 310 includes a power supply 316 and may be electrically coupled to an external power source 318 via an electrical cable 320. The charging system 300 also includes charging circuitry, which may include reader charging circuitry 308 in the barcode reader 302 and/or cradle charging circuitry 312 in the charging cradle 310. The charging circuitry may be configured to convert electricity that is available from the external power source 318 into current(s) and voltage(s) that are appropriate for the rechargeable power source 306.

In the depicted charging system 300, the rechargeable power source 306 may be configured to notify the charging circuitry about the charging current and the charging voltage that are appropriate for the rechargeable power source 306. The rechargeable power source 306 may include circuitry (which may be referred to herein as notification circuitry 332) that is configured to communicate this information to the charging circuitry.

The rechargeable power source 306 may communicate with the charging circuitry via one or more data interfaces. For example, the barcode reader 302 may include a data interface 328 between the rechargeable power source 306 and the reader charging circuitry 308. The rechargeable power source 306 may use this data interface 328 to communicate current and voltage information to the reader charging circuitry 308. The barcode reader 302 and the charging cradle 310 may also be configured such that there is a data interface 330 between the rechargeable power source 306 and the cradle charging circuitry 312 when the barcode reader 302 is placed in the charging cradle 310. The rechargeable power source 306 may use this data interface 330 to communicate current and voltage information to the cradle charging circuitry 312.

In FIG. 3, the data interfaces 328, 330 are shown as separate interfaces. In some alternative implementations, however, there may be at least some overlap between the data interfaces 328, 330. For example, in some implementations, the data interface 330 between the rechargeable power source 306 and the cradle charging circuitry 312 may include at least some portion of the data interface 328 between the rechargeable power source 306 and the reader charging circuitry 308.

Figure 4:
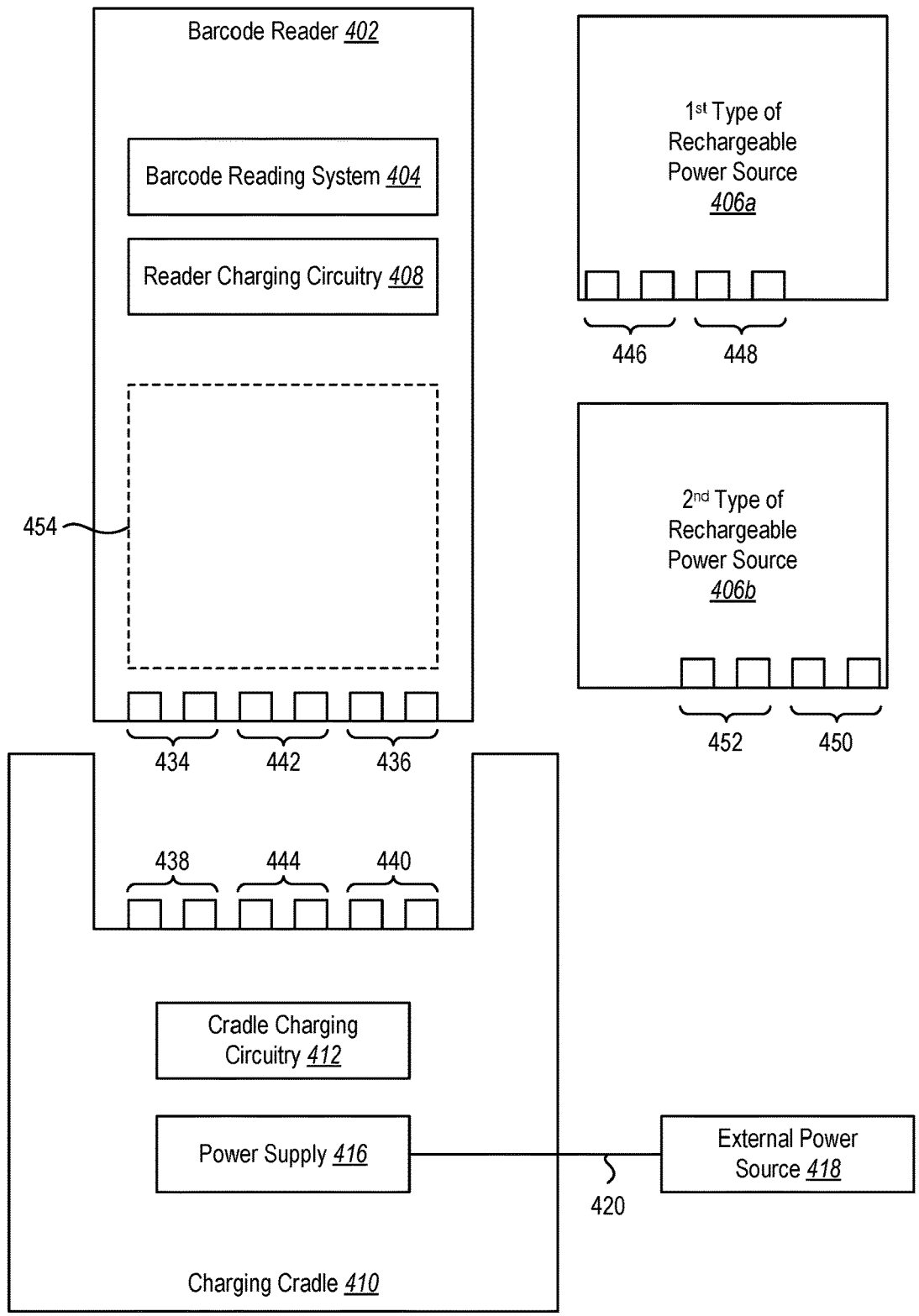
FIG. 4 illustrates another example of a charging system in accordance with the present disclosure, in which the barcode reader and the charging cradle both include at least one additional set of charging contacts.

FIG. 4 illustrates another example of a charging system 400 for a barcode reader 402 in accordance with the present disclosure. The charging system 400 is similar in some respects to the charging systems 100, 300 described previously. For example, the charging system 400 includes a barcode reader 402, which includes a barcode reading system 404. The barcode reader 402 is configured to use different types of rechargeable power sources 406a-b. The barcode reader 402 interfaces with a charging cradle 410. The charging cradle 410 includes a power supply 416, and the charging cradle 410 may be electrically coupled to an external power source 418 via an electrical cable 420. The charging system 400 also includes charging circuitry, which may include reader charging circuitry 408 in the barcode reader 402 and/or cradle charging circuitry 412 in the charging cradle 410.

In the depicted charging system 400, the barcode reader 402 and the charging cradle 410 both include at least one additional set of charging contacts, so that there is a dedicated set of charging contacts for each type of rechargeable power source that is used by the barcode reader 402. For example, the barcode reader 402 may include a first set of charging contacts 434 corresponding to a first type of rechargeable power source 406a (e.g., a rechargeable battery) and a second set of charging contacts 436 corresponding to a second type of rechargeable power source 406b (e.g., a supercapacitor). These charging contacts 434, 436 may be referred to herein as reader charging contacts 434, 436. Similarly, the charging cradle 410 may include a first set of charging contacts 438 corresponding to the first type of rechargeable power source 406a and a second set of charging contacts 440 corresponding to the second type of rechargeable power source 406b. These charging contacts 438, 440 may be referred to herein as cradle charging contacts 438, 440.

FIG. 4 shows the reader 402 when it is located outside of the charging cradle 410. The reader charging contacts 434, 436 are positioned on the barcode reader 402 and the cradle charging contacts 438, 440 are positioned on the charging cradle 410 such that when the barcode reader 402 is placed in the charging cradle 410, the first set of reader charging contacts 434 are in physical contact with the first set of cradle charging contacts 438 and the second set of reader charging contacts 436 are in physical contact with the second set of cradle charging contacts 440.

The barcode reader 402 may include a set of data contacts 442, and the charging cradle 410 may include a set of data contacts 444 as well. Data may be transferred from the barcode reader 402 to the charging cradle 410 (or vice versa) via the data contacts 442, 444. The charging cradle 410 may also be capable of communicating with one or more other computing devices. In this scenario, the data contacts 442, 444 may facilitate communication between the barcode reader 402 and the other computing device(s) via the charging cradle 410.

The barcode reader 402 includes a receptacle 454 for storing a rechargeable power source. The receptacle 454 may be configured to accommodate different types of rechargeable power sources 406a-b.

The first type of rechargeable power source 406a includes charging contacts 446 and data contacts 448. The second type of rechargeable power source 406b also includes charging contacts 450 and data contacts 452. Although the data contacts 448, 452 are located in the same position on both of the rechargeable power sources 406a-b, the charging contacts 446, 450 are located in different positions. Specifically, the charging contacts 446 are positioned on the first type of rechargeable power source 406a such that when the first type of rechargeable power source 406a is placed in the receptacle 454 within the barcode reader 402, the charging contacts 446 are in physical contact with the first set of reader charging contacts 434. On the other hand, the charging contacts 450 are positioned on the second type of rechargeable power source 406b such that when the second type of rechargeable power source 406b is placed the receptacle 454 within the barcode reader 402, the charging contacts 450 are in physical contact with the second set of reader charging contacts 436.

The cradle charging circuitry 412 may be configured to provide different current and voltage to the different cradle charging contacts 438, 440. More specifically, the cradle charging circuitry 412 may be configured to provide the first cradle charging contacts 438 with a charging current and a charging voltage that are appropriate for the first type of rechargeable power source 406a. Conversely, the cradle charging circuitry 412 may be configured to provide the second cradle charging contacts 440 with a charging current and a charging voltage that are appropriate for the second type of rechargeable power source 406b.

When the barcode reader 402 is placed in the charging cradle 410, the first reader charging contacts 434 receive the charging current and the charging voltage that are appropriate for the first type of rechargeable power source 406a because they are in physical contact with the first cradle charging contacts 438. Similarly, the second reader charging contacts 436 receive the charging current and the charging voltage that are appropriate for the second type of rechargeable power source 406b because they are in physical contact with the second cradle charging contacts 440.

If the first type of rechargeable power source 406a is in the receptacle 454 within the barcode reader 402, the charging contacts 446 on the first type of rechargeable power source 406a receive the charging current and the charging voltage that are appropriate for the first type of rechargeable power source 406a because they are in physical contact with the first reader charging contacts 434. On the other hand, if the second type of rechargeable power source 406b is in the receptacle 454 within the barcode reader 402, the charging contacts 450 on the second type of rechargeable power source 406b receive the charging current and the charging voltage that are appropriate for the second type of rechargeable power source 406b because they are in physical contact with the second reader charging contacts 436.

Thus, in the charging system 400 shown in FIG. 4, it is not necessary for the charging circuitry to be able to detect which type of rechargeable power source is being used by the barcode reader 402. Nor is it necessary for the rechargeable power source to notify the charging circuitry about the charging current and charging voltage that are appropriate for the rechargeable power source. Instead, the charging circuitry provides the appropriate charging current and charging voltage for both types of rechargeable power sources 406a-b, and the rechargeable power sources 406a-b themselves are configured so that they automatically receive the appropriate charging current and charging voltage when they are placed in the barcode reader 402.

The charging systems 100, 300, 400 that have been discussed so far have been configured so that the charging of a rechargeable power source occurs when the rechargeable power source is inside of a barcode reader, and the barcode reader is placed in a charging cradle. However, a charging system in accordance with the present disclosure may alternatively be configured so that a rechargeable power source may be charged independently of a barcode reader by being placed directly inside of a charging cradle.

Figure 5:
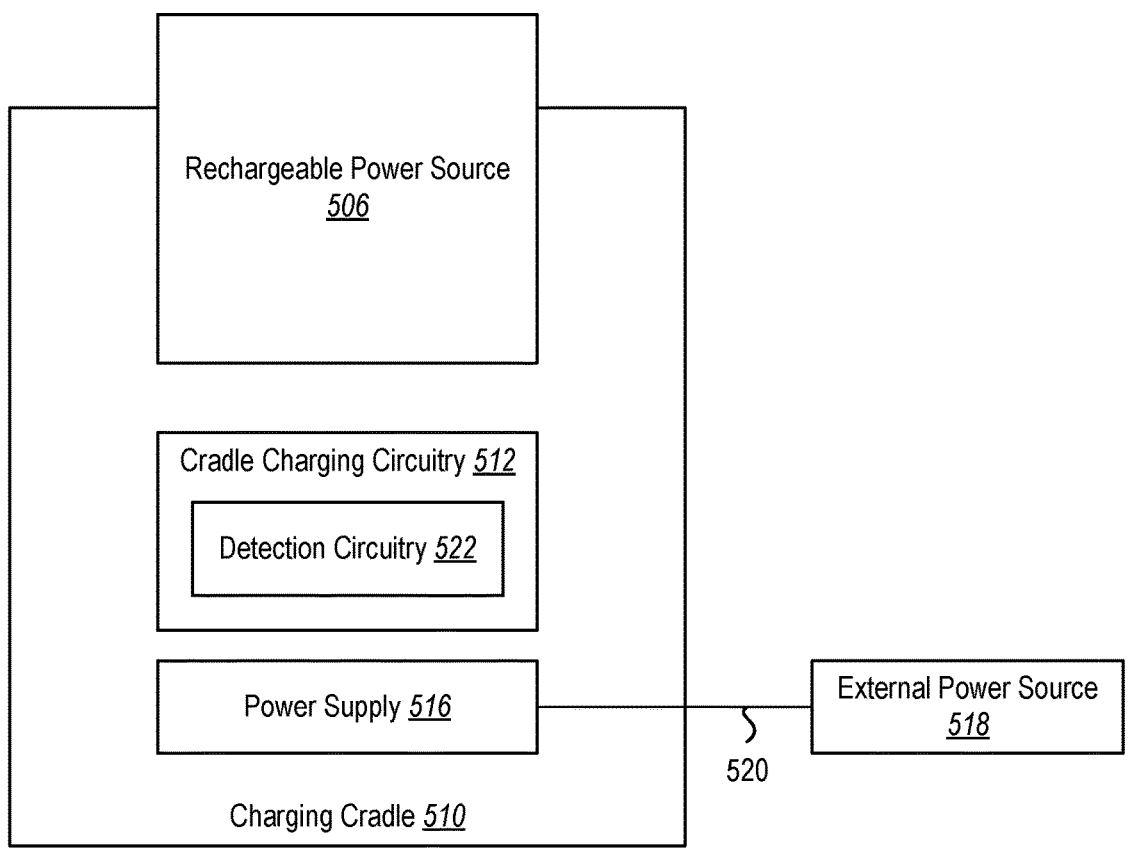
FIG. 5 illustrates another example of a charging system in accordance with the present disclosure, in which a rechargeable power source is placed directly inside of a charging cradle and the charging cradle detects the type of rechargeable power source that has been placed therein.

FIG. 5 illustrates an example of such a charging system 500. The charging system 500 is similar in some respects to the charging systems 100, 300, 400 described previously. For example, the charging system 500 includes a charging cradle 510. The charging cradle 510 includes a power supply 516 and may be electrically coupled to an external power source 518 via an electrical cable 520.

In the charging system 500 that is shown in FIG. 5, the charging cradle 510 may be configured so that it can charge a rechargeable power source 506 that is placed directly inside of the charging cradle 510 (without a barcode reader). The charging cradle 510 may include charging circuitry 512, which may be referred to herein as cradle charging circuitry 512. The cradle charging circuitry 512 may be configured to convert electricity that is available from the external power source 518 into current(s) and voltage(s) that are appropriate for the rechargeable power source 506.

The charging cradle 510 may be configured so that it can charge different types of rechargeable power sources 506. Because different types of rechargeable power sources 506 have different current and voltage requirements, the cradle charging circuitry 512 adjusts the charging current and the charging voltage for the different types of rechargeable power sources 506 that are charged by the charging cradle 510.

In the depicted embodiment, the cradle charging circuitry 512 includes circuitry that detects the type of rechargeable power source 506 that has been placed in the charging cradle 510. This circuitry will be referred to herein as detection circuitry 522. Once the type of rechargeable power source 506 has been detected, the cradle charging circuitry 512 may then provide the charging current and the charging voltage that are appropriate for that type of rechargeable power source 506. For example, if the detection circuitry 522 detects that the rechargeable power source 506 is a first type of rechargeable power source 506 (e.g., a rechargeable battery), the cradle charging circuitry 512 may then provide the charging current and the charging voltage that are appropriate for the first type of rechargeable power source 506. Alternatively, if the detection circuitry 522 detects that the rechargeable power source 506 is a second type of rechargeable power source 506 (e.g., a supercapacitor), the cradle charging circuitry 512 may then provide the charging current and the charging voltage that are appropriate for the second type of rechargeable power source 506.

Figure 6:
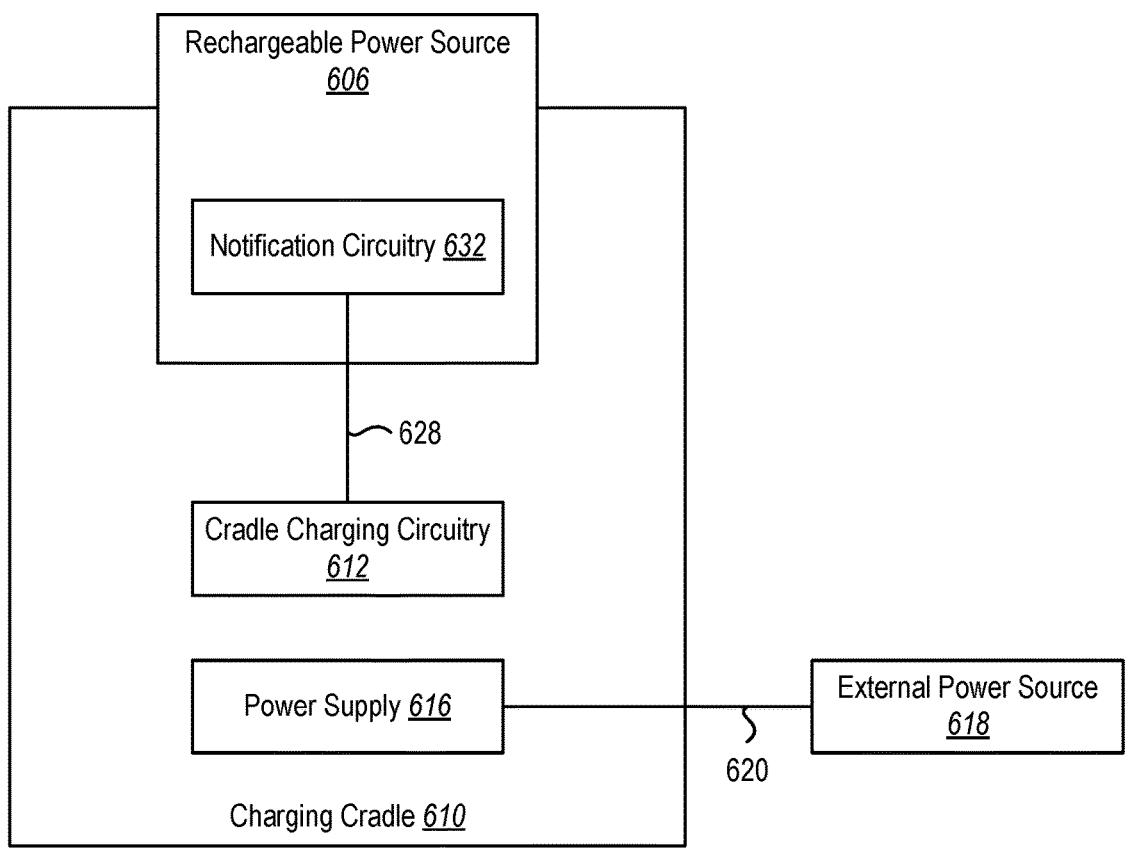
FIG. 6 illustrates another example of a charging system in accordance with the present disclosure, in which a rechargeable power source is placed directly inside of a charging cradle and the rechargeable power source notifies the charging circuitry about the charging current and the charging voltage that are appropriate for the rechargeable power source.

FIG. 6 illustrates another example of a charging system 600 in accordance with the present disclosure. The charging system 600 is similar in some respects to the charging system 500 that was described above in connection with FIG. 5. For example, the charging system 600 includes a charging cradle 610 that can charge a rechargeable power source 606 that is placed directly inside of the charging cradle 610 (without a barcode reader). The charging cradle 610 includes a power supply 616, and the charging cradle 610 may be electrically coupled to an external power source 618 via an electrical cable 620. The charging cradle 610 also includes charging circuitry 612, which may be configured to convert electricity that is available from the external power source 618 into current(s) and voltage(s) that are appropriate for the rechargeable power source 606.

The charging cradle 610 may also be configured so that it can charge different types of rechargeable power sources 606. However, instead of detecting which type of rechargeable power source 606 is being charged (as in the charging system 500 described previously in connection with FIG. 5), in the depicted charging system 600 the rechargeable power source 606 may be configured to notify the cradle charging circuitry 612 about the charging current and the charging voltage that are appropriate for the rechargeable power source 606. The rechargeable power source 606 may include circuitry (which may be referred to herein as notification circuitry 632) that is configured to communicate this information to the cradle charging circuitry 612.

The rechargeable power source 606 and the charging cradle 610 may be configured such that there is a data interface 628 between the rechargeable power source 606 and the cradle charging circuitry 612 when the rechargeable power source 606 is placed in the charging cradle 610. The rechargeable power source 606 may use this data interface 628 to communicate current and voltage information to the cradle charging circuitry 612.

Figure 7:
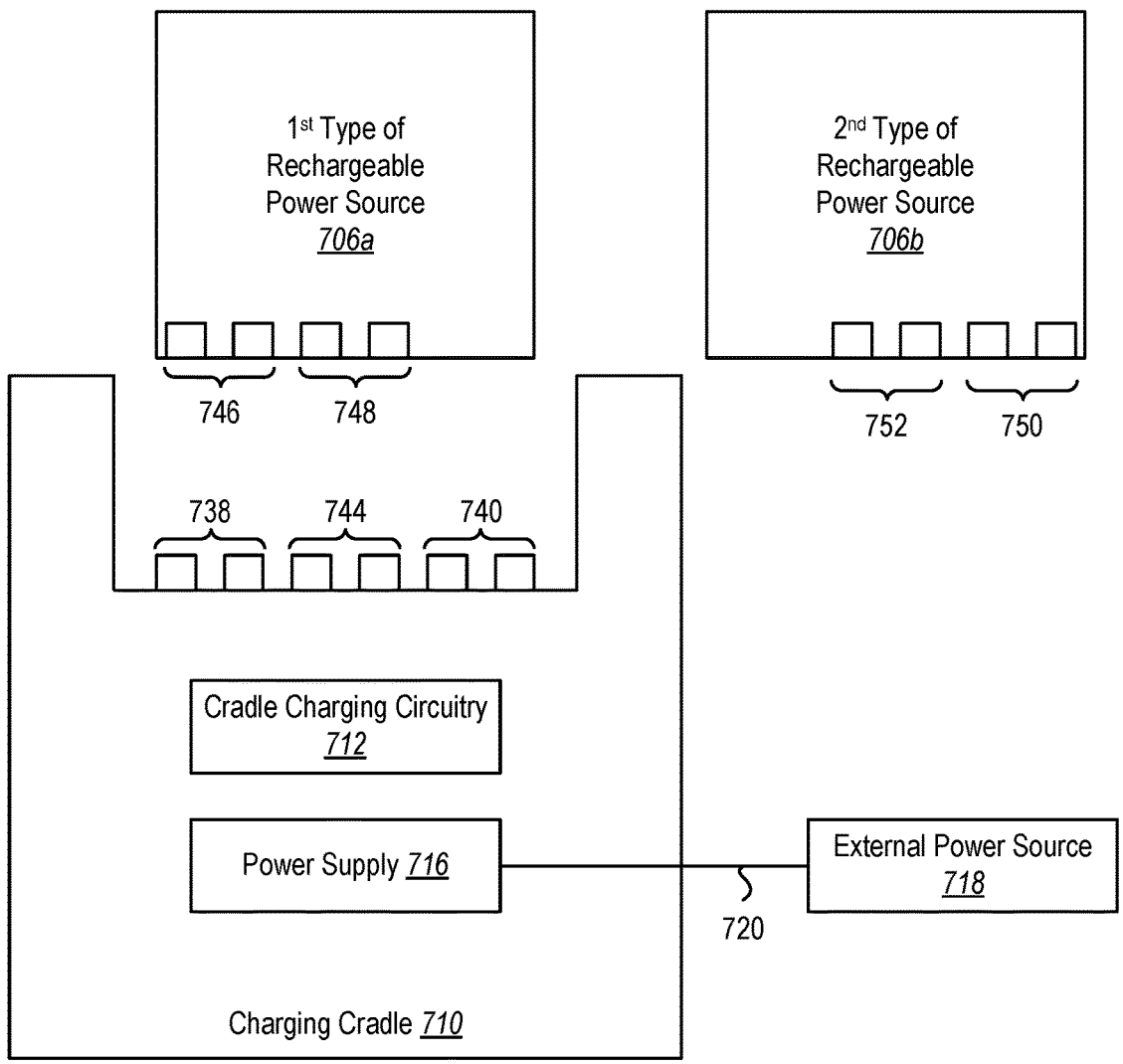
FIG. 7 illustrates another example of a charging system for a barcode reader in accordance with the present disclosure, in which a rechargeable power source is placed directly inside of a charging cradle and the charging cradle includes at least one additional set of charging contacts.

FIG. 7 illustrates another example of a charging system 700 in accordance with the present disclosure. The charging system 700 is similar in some respects to the charging systems 500, 600 that were described above in connection with FIGS. 5 and 6. For example, the charging system 700 includes a charging cradle 710 that can charge a rechargeable power source that is placed directly inside of the charging cradle 710 (without a barcode reader). The charging cradle 710 includes a power supply 716, and the charging cradle 710 may be electrically coupled to an external power source 718 via an electrical cable 720. The charging system 700 also includes charging circuitry 712, which may be configured to convert electricity that is available from the external power source 718 into current(s) and voltage(s) that are appropriate for the rechargeable power source 706.

The charging cradle 710 may also be configured so that it can charge different types of rechargeable power sources 706. In the depicted charging system 700, this is accomplished by including at least one additional set of charging contacts in the charging cradle 710, so that there is a dedicated set of charging contacts for each type of rechargeable power source that the charging cradle 710 is capable of charging.

For example, the charging cradle 710 may include a first set of charging contacts 738 corresponding to a first type of rechargeable power source 706a (e.g., a rechargeable battery) and a second set of charging contacts 740 corresponding to a second type of rechargeable power source 706b (e.g., a supercapacitor). These charging contacts 738, 740 may be referred to herein as cradle charging contacts 738, 740. The charging cradle 710 may also include a set of data contacts 744.

The first type of rechargeable power source 706a includes charging contacts 746 and data contacts 748. The second type of rechargeable power source 706b also includes charging contacts 750 and data contacts 752. Although the data contacts 748, 752 are located in the same position on both of the rechargeable power sources 706a-b, the charging contacts 746, 750 are located in different positions. Specifically, the charging contacts 746 are positioned on the first type of rechargeable power source 706a such that when the first type of rechargeable power source 706a is placed in the charging cradle 710, the charging contacts 746 are in physical contact with the first set of cradle charging contacts 738. On the other hand, the charging contacts 750 are positioned on the second type of rechargeable power source 706b such that when the second type of rechargeable power source 706b is placed in the charging cradle 710, the charging contacts 750 are in physical contact with the second set of cradle charging contacts 740.

The cradle charging circuitry 712 may be configured to provide different current and voltage to the different cradle charging contacts 738, 740. More specifically, the cradle charging circuitry 712 may be configured to provide the first set of cradle charging contacts 738 with a charging current and a charging voltage that are appropriate for the first type of rechargeable power source 706a. Conversely, the cradle charging circuitry 712 may be configured to provide the second set of cradle charging contacts 740 with a charging current and a charging voltage that are appropriate for the second type of rechargeable power source 706b.

If the first type of rechargeable power source 706a is placed in the charging cradle 710, the charging contacts 746 on the first type of rechargeable power source 706a receive the charging current and the charging voltage that are appropriate for the first type of rechargeable power source 706a because they are in physical contact with the first set of cradle charging contacts 738. On the other hand, if the second type of rechargeable power source 706b is placed in the charging cradle 710, the charging contacts 750 on the second type of rechargeable power source 706b receive the charging current and the charging voltage that are appropriate for the second type of rechargeable power source 706b because they are in physical contact with the second set of cradle charging contacts 740.

Thus, in the charging system 700 shown in FIG. 7, it is not necessary for the charging cradle 710 to be able to detect which type of rechargeable power source has been placed in the charging cradle 710. Nor is it necessary for the rechargeable power source to notify the charging cradle 710 about the charging current and charging voltage that are appropriate for the rechargeable power source. Instead, the cradle charging circuitry 712 provides the appropriate charging current and charging voltage for both types of rechargeable power sources 706a-b, and the rechargeable power sources 706a-b themselves are configured so that they automatically receive the appropriate charging current and charging voltage when they are placed in the charging cradle 710.

Figure 8:
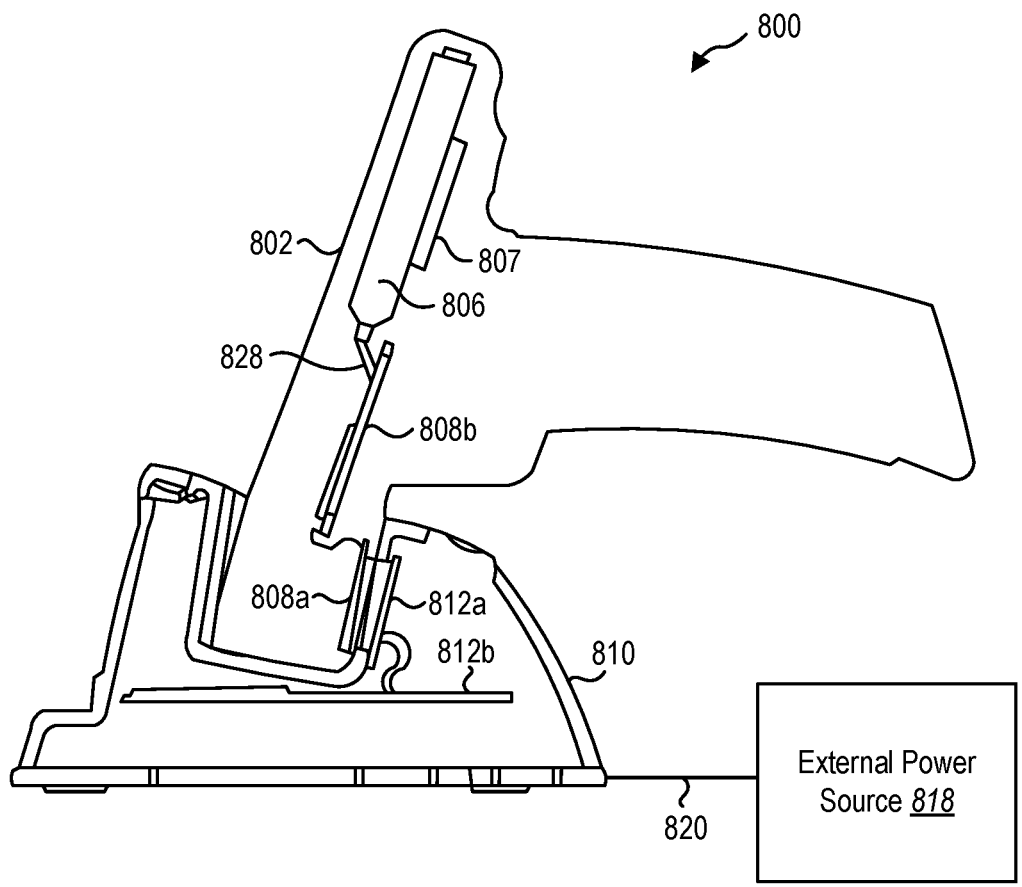
FIG. 8 illustrates another example of a charging system in accordance with the present disclosure, in which energy is transferred from the charging cradle to the barcode reader via electromagnetic induction.

FIG. 8 illustrates another example of a charging system 800 in accordance with the present disclosure. The charging system 800 is similar in some respects to some of the charging systems 100, 300, 400 that were described previously. For example, the charging system 800 includes a barcode reader 802 that includes a rechargeable power source 806. The barcode reader 802 interfaces with a charging cradle 810. The charging cradle 810 may be electrically coupled to an external power source 818 via an electrical cable 820.

The charging system 800 also includes charging circuitry. In the depicted charging system 800, the charging circuitry includes a charging coil 808a within the barcode reader 802 and a charging coil 812a within the charging cradle 810. The charging coil 808a within the barcode reader 802 may be referred to herein as a reader charging coil 808a, and the charging coil 812a within the charging cradle 810 may be referred to herein as a cradle charging coil 812a. The reader charging coil 808a and the cradle charging coil 812a may be induction coils that are not in physical contact with each other. The reader charging coil 808a and the cradle charging coil 812a may be configured so that when the charging cradle 810 is connected to the external power source 818 and the barcode reader 802 is placed in the charging cradle 810, the cradle charging coil 812a transfers energy to the reader charging coil 808a via electromagnetic induction. The reader charging coil 808a may then transfer energy (either directly or through other circuitry within the reader 802) to the rechargeable power source 806. Alternatively, instead of using induction coils, the barcode reader 802 and the charging cradle 810 may use capacitive plates with a capacitive electric field therebetween for transferring power via capacitive coupling.

The charging circuitry may also include other charging circuitry 812b within the charging cradle 810 (which may be referred to herein as cradle charging circuitry 812b) and/or other charging circuitry 808b within the barcode reader 802 (which may be referred to herein as reader charging circuitry 808b). The cradle charging circuitry 812b and/or the reader charging circuitry 808b may be configured to convert the electricity that is received from the external power source 818 into current(s) and voltage(s) that are appropriate for the rechargeable power source 806. Because the barcode reader 802 may be configured to use different types of rechargeable power sources 806, the cradle charging circuitry 812b and/or the reader charging circuitry 808b may be configured to adjust the charging current and the charging voltage for the different types of rechargeable power sources 806 that are used by the barcode reader 802. There may also be additional circuitry 807 within the rechargeable power source 806 that adjusts the charging current and the charging voltage. This circuitry 807 may function independently of, or in conjunction with, the reader charging circuitry 808b and the cradle charging circuitry 812b.

The reader charging circuitry 808b may be configured to detect the type of rechargeable power source 806 that is being used by the barcode reader 802. Alternatively, the rechargeable power source 806 may notify the reader charging circuitry 808b about the current and voltage that are appropriate for the rechargeable power source 806. This notification may occur via a data interface 828 between the rechargeable power source 806 and the reader charging circuitry 808b. Once the type of rechargeable power source 806 has been determined, the reader charging circuitry 808b and/or the cradle charging circuitry 812b may adjust the charging current and the charging voltage based on the type of rechargeable power source 806 that is being used.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
   a barcode reader that is configured to use different types of rechargeable power sources; and
   charging circuitry that is configured to provide a charging current and a charging voltage for a rechargeable power source that is being used by the barcode reader, wherein the charging circuitry is configured to adjust at least one of the charging current or the charging voltage for the different types of rechargeable power sources that are used by the barcode reader.

2. The system of claim 1, wherein:
   the charging circuitry is configured to provide a first charging current and a first charging voltage when the rechargeable power source comprises a first type of rechargeable power source; and
   the charging circuitry is configured to adjust at least one of the first charging current or the first charging voltage when the rechargeable power source comprises a second type of rechargeable power source.

3. The system of claim 2, wherein:
   the first type of rechargeable power source comprises a rechargeable battery; and
   the second type of rechargeable power source comprises a supercapacitor.

4. The system of claim 1, wherein the charging circuitry is additionally configured to:
   detect a type of rechargeable power source that is being used by the barcode reader; and
   provide the charging current and the charging voltage that are appropriate for that type of rechargeable power source.

5. The system of claim 1, wherein the charging circuitry is additionally configured to receive notification from the rechargeable power source about the charging current and the charging voltage that are appropriate for the rechargeable power source.

6. The system of claim 1, wherein:
   the barcode reader further comprises a first set of reader charging contacts corresponding to a first type of rechargeable power source and a second set of reader charging contacts corresponding to a second type of rechargeable power source;
   the first type of rechargeable power source is positionable within the barcode reader such that first charging contacts on the first type of rechargeable power source are in physical contact with the first set of reader charging contacts; and
   the second type of rechargeable power source is positionable within the barcode reader such that second charging contacts on the second type of rechargeable power source are in physical contact with the second set of reader charging contacts.

7. The system of claim 6, wherein:
   the charging circuitry is additionally configured to provide a first charging current and a first charging voltage to the first set of reader charging contacts; and
   the charging circuitry is additionally configured to provide a second charging current and a second charging voltage to the second set of reader charging contacts.

8. The system of claim 7, wherein:
   the system further comprises a charging cradle for the barcode reader, wherein the charging cradle comprises a first set of cradle charging contacts corresponding to the first type of rechargeable power source and a second set of cradle charging contacts corresponding to the second type of rechargeable power source; and
   the first set of reader charging contacts, the second set of reader charging contacts, the first set of cradle charging contacts, and the second set of cradle charging contacts are positioned such that when the barcode reader is placed in the charging cradle, the first set of reader charging contacts are in physical contact with the first set of cradle charging contacts and the second set of reader charging contacts are in physical contact with the second set of cradle charging contacts.

9. The system of claim 8, wherein the charging circuitry is additionally configured to:
   provide the first charging current and the first charging voltage to the first set of cradle charging contacts; and
   provide the second charging current and the second charging voltage to the second set of cradle charging contacts.

10. The system of claim 1, wherein:
the system further comprises a charging cradle for the barcode reader;
the charging circuitry further comprises a cradle charging coil within the charging cradle and a reader charging coil within the barcode reader; and
the cradle charging coil transfers energy to the reader charging coil via electromagnetic induction when the charging cradle is connected to an external power source and the barcode reader is placed in the charging cradle.

11. A system, comprising:
a charging cradle that is configured to charge a rechargeable power source; and
charging circuitry within the charging cradle, the charging circuitry being configured to:
provide a charging current and a charging voltage when the rechargeable power source corresponds to a first type of rechargeable power source; and
adjust at least one of the charging current or the charging voltage when the rechargeable power source corresponds to a second type of rechargeable power source.

12. The system of claim 11, wherein:
the first type of rechargeable power source comprises a rechargeable battery; and
the second type of rechargeable power source comprises a supercapacitor.

13. The system of claim 11, wherein the charging circuitry is additionally configured to detect whether the rechargeable power source corresponds to the first type of rechargeable power source or the second type of rechargeable power source.

14. The system of claim 11, wherein the charging circuitry is additionally configured to receive notification from the rechargeable power source about the charging current and the charging voltage that are appropriate for the rechargeable power source.

15. The system of claim 11, wherein:
the charging cradle comprises a first set of cradle charging contacts corresponding to the first type of rechargeable power source and a second set of cradle charging contacts corresponding to the second type of rechargeable power source;
the first type of rechargeable power source is positionable within the charging cradle such that first charging contacts on the first type of rechargeable power source are in physical contact with the first set of cradle charging contacts; and
the second type of rechargeable power source is positionable within the charging cradle such that second charging contacts on the second type of rechargeable power source are in physical contact with the second set of cradle charging contacts.

16. The system of claim 15, wherein the charging circuitry is additionally configured to:
provide a first charging current and a first charging voltage to the first set of cradle charging contacts; and
provide a second charging current and a second charging voltage to the second set of cradle charging contacts.

17. A system, comprising:
a barcode reader that is configured to use different types of rechargeable power sources; and
charging circuitry that is configured to:
provide a charging current and a charging voltage when a rechargeable power source that is being used by the barcode reader corresponds to a first type of rechargeable power source; and
adjust at least one of the charging current or the charging voltage when the rechargeable power source that is being used by the barcode reader corresponds to a second type of rechargeable power source.

18. The system of claim 17, wherein the charging circuitry is additionally configured to detect whether the rechargeable power source that is being used by the barcode reader corresponds to the first type of rechargeable power source or the second type of rechargeable power source.

19. The system of claim 17, wherein the charging circuitry is additionally configured to receive notification from the rechargeable power source about the charging current and the charging voltage that are appropriate for the rechargeable power source that is being used by the barcode reader.

20. The system of claim 17, wherein:
the barcode reader further comprises a first set of reader charging contacts corresponding to the first type of rechargeable power source and a second set of reader charging contacts corresponding to the second type of rechargeable power source;
the first type of rechargeable power source is positionable within the barcode reader such that first charging contacts on the first type of rechargeable power source are in physical contact with the first set of reader charging contacts; and
the second type of rechargeable power source is positionable within the barcode reader such that second charging contacts on the second type of rechargeable power source are in physical contact with the second set of reader charging contacts.

* * * * *